Jan. 19, 1943.  C. W. STRATFORD  2,308,755
METHOD OF TREATING OIL
Original Filed Dec. 8, 1937
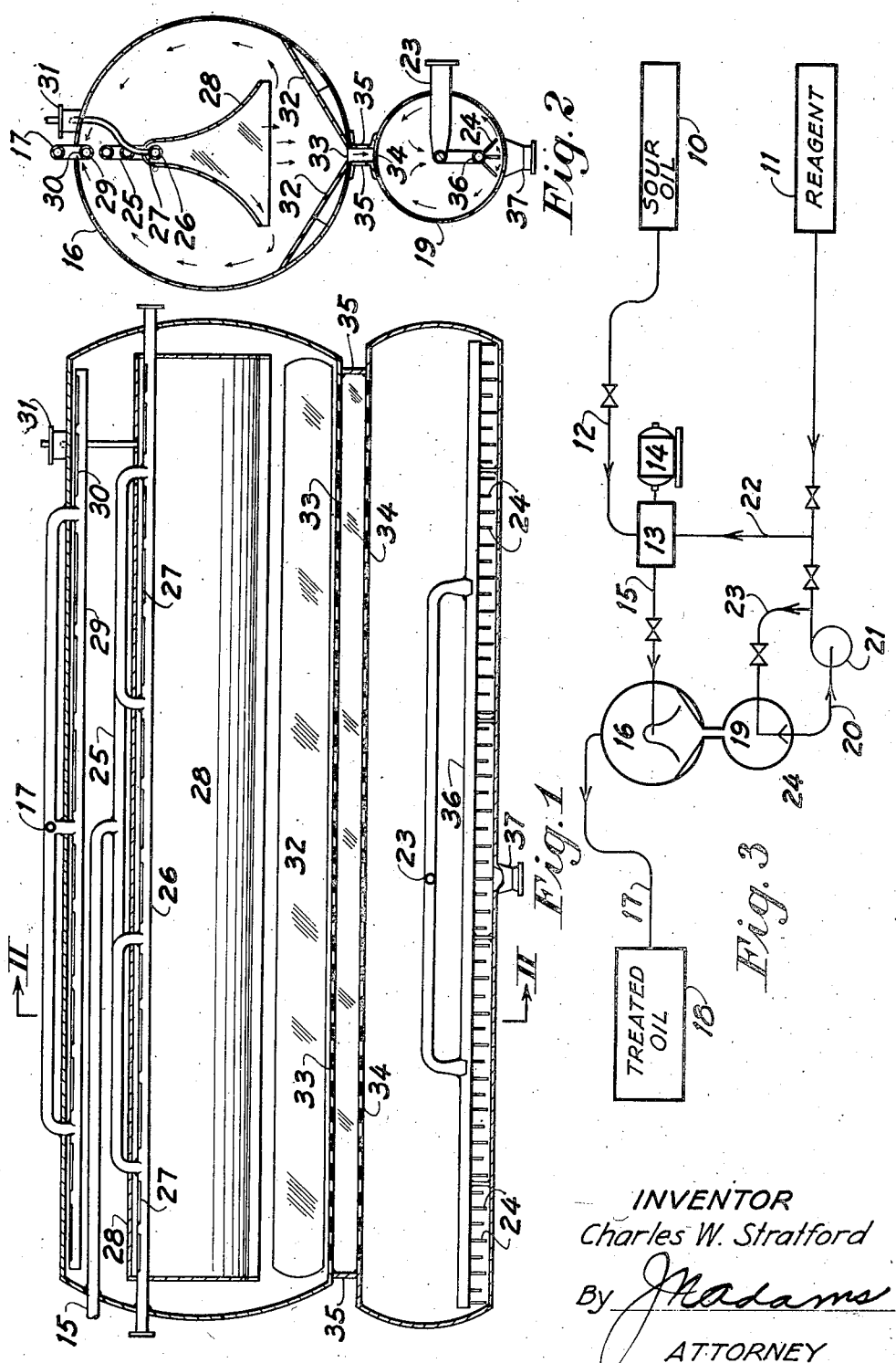
INVENTOR
Charles W. Stratford
By J. H. Adams
ATTORNEY Patented Jan. 19, 1943

2,308,755

UNITED STATES PATENT OFFICE 2,308,755

METHOD OF TREATING OIL

Charles W. Stratford, Kansas City, Mo., assignor to Standard Oil Company of California, San Francisco, Calif., a corporation of Delaware Original application December 8, 1937, Serial No. 178,746. Divided and this application September 22, 1939, Serial No. 296,071

5 Claims. (Cl. 196—30)

This invention relates to a method and apparatus for the continuous mixing of liquids and solids so that they may react chemically, after which they are separated for reuse or disposal; and particularly refers to those operations wherein a finely-divided solid reactive material is suspended in an aqueous liquid reactive material and contacted with an untreated liquid of less density, such as an oil, said reactive materials being subsequently continuously separated from the treated liquid for use with additional untreated liquid. This application is a division of my copending application, Serial No. 178,746, which issued February 13, 1940 as Patent No. 2,190,247.

In the continuous treatment of partially refined oils, for example, sour gasoline or kerosene with lead sulfide and caustic, according to the G. L. Rowsey Patents Nos. 1,754,649 and 1,954,103 and the E. S. Brown et al. Patent No. 2,049,423, the oil to be treated is first contacted with a caustic solution in which is suspended finely-divided lead sulfide. These are intimately mixed in the presence of air to promote contact and chemical reaction with the undesired components of the sour gasoline or kerosene and are then allowed to remain relatively quiescent so that gravity separation of the heavier caustic and lead sulfide will take place. The separated caustic and lead sulfide are preferably continuously withdrawn and may be used to treat additional quantities of untreated oil entering the system.

Inasmuch as the finely-divided particles of lead sulfide are individually quite dense, it would be expected that they would quickly separate out of the oil and also readily fall to the bottom of any caustic layer that would underlie the oil in the settling chamber. It has been found, however, that the lead sulfide particles, perhaps due to a surface tension effect, do not settle, but accumulate in considerable quantities throughout the system, particularly at or near the interface between the separated layers of oil and caustic and also at the bottom of the caustic. Consequently, the usual procedure for withdrawal, namely, removing the supposedly separated caustic and lead sulfide from the quiescent body of the same at the lowest portion of the settler or from a separate container below the main chamber has not proved completely successful.

This invention, therefore, comprehends broadly a method and means for keeping the lead sulfide particles in suspension throughout the separated caustic layer or at least preventing their accumulation at the top or at the bottom of the latter by agitating the same so that those two reactive materials may be continuously withdrawn in a uniform and active condition for reuse as by mixing with the incoming oil to be treated. Obviously, the invention is not so limited in its use and may be suited to other processes and environments where applicable.

It is an object of this invention to provide an improved form of settling apparatus combined with agitating means for certain of the separated components, the effect of said agitation being substantially confined to a restricted portion of the apparatus so as not to interfere with the preceding settling operation.

Another object is to provide an improved treating system for a mixture of liquids and a finely-divided solid material, whereby all the solid material may be easily removed from the system without scrapers, conveyors or the like, or without agitation of the liquid in the settling section of the system, and thus be made available for chemical treating use.

These and other objects and advantages will be further apparent from the following description and from the attached drawing, which forms a part of this specification and illustrates a preferred embodiment of the invention.

In the drawing,

Figure 1 is a vertical sectional view on the longitudinal axis of a preferred form of settler and mixer embodying this invention.

Figure 2 is a vertical sectional view on line II—II of the apparatus of Figure 1 on a plane transverse to the longitudinal axis.

Figure 3 is a simplified flow diagram of the arrangement of the equipment of Figures 1 and 2.

Referring to the drawing and particularly to Figure 3, which illustrates a simplified flow diagram of a system in which the invention may be employed, the reference numeral 10 illustrates a source of sour oil, such as gasoline or kerosene, and 11 is a source of reagent, such as strong caustic soda solution. Normally, there is a constant flow of sour oil through line 12 to a mixing device or contactor generally represented by numeral 13, which may be of the centrifugal type disclosed in my Patent No. 1,736,018 and driven by a suitable prime mover such as motor 14. From contactor 13 a mixture of previously formed reagents and oil passes through line 15 into settler 16, wherein gravity separation of the now treated oil and the reagents takes place. The treated and separated oil passes out of settler 16 through line 17 to a suitable storage such as tank 18 while the heavier separated reagents drop into a mixer 19 below settler 16, from which they are withdrawn through line 20 by circulating pump 21.

The reagent stream, in this example a suspension of lead sulfide in strong caustic soda solution, leaves the pump 21, and then divides, part going back to contactor 13 through line 22 to treat incoming sour oil, and part returning through line 23 to a system of jets or nozzles 24 in mixer 19 to agitate the reagent accumulating therein in order to maintain its components in a proper and active suspension. As the reagent, particularly the caustic, becomes exhausted or depleted by the treating process, added amounts of stronger solution may be admitted to the circulating stream through line 22 from reagent source 11.

Referring now to Figures 1 and 2 of the drawing, which illustrate in greater detail the construction of the settler 16 and mixer 19, it will be noted that these are preferably, but not necessarily horizontal cylindrical tanks, joined by a narrow elongated passage for a purpose which will be described in greater detail below.

The contacted oil and reagent inlet 15 to settler 16 is preferably arranged to give uniform liquid distribution, as would be obtained from a header 25 branching into a distributor pipe 26, the latter slotted along its upper side as at 27. Pipe 26 is positioned in the upper part of a directing hood 28, which is open at the bottom, as shown in Figure 2. At the top of settler 16 is a gathering pipe 29 along the top of which is a narrow slot or a succession of slots 30 into which the oil overflows, passing from pipe 29 into line 17, as previously explained. An air vent 31 is provided from hood 28 and shell 16 and is fitted with any suitable valve means to remove excess air and gaseous residues from the system. Such a structure is generally illustrated in my Patent No. 1,868,775.

It has been found that the finely-divided lead sulfide tends to deposit in settler 16 on any except sloping surfaces, so that guiding baffles or slide plates 32 are preferably provided, one on each side of the center of the bottom of mixer 16, and set at an angle of about 30°, to direct the downwardly settling heavier liquid and the solid particles therein to a row of holes or slots 33, extending substantially the entire length of the mixer.

Mixer 19, previously mentioned, is positioned beneath settler 16 and substantially parallel thereto. A series of holes or slots 34 are provided along the top of mixer 19, and are maintained in communication with holes 33 in settler 16 by an elongated narrow passage formed by plates 35 which connect the mixer and settler as shown in Figures 1 and 2. An arrangement such as that just described serves effectively to pass the downwardly settling liquid and solid reagents uniformly and continuously from settler 16 into mixer 19 and yet is effective to prevent turbulence and agitation of the liquids in mixer 19 being transmitted into settler 16 to interfere with the substantially quiescent liquid body therein.

Mixer 19 is provided with agitating means of any desired type, in this example, a distributor pipe generally designated 36, in which are mounted a series of downwardly and sidewardly directed jets or nozzles 24. Recirculated reagents, and usually some oil are withdrawn through outlet nozzle 37 in mixer 19 by pump 21 and are returned through line 23 to the distribution system 36—24 through which they are directed at high velocity back into the liquid in mixer 19 to agitate the same as indicated by the arrows in Figure 2 and keep the liquid and finely-divided solid reagents in a uniform and effective suspension. One result particularly desired and which is attained by the arrangement just described, is the prevention of accumulations of the finely-divided solids at the interface between the layer of oil and the heavier layer of reagent below the oil and at the bottom of the heavier reagent layer. It has been discovered that the maintenance of a homogeneous suspension prolongs the effectiveness of the reagents so that the caustic in particular may be used to lower concentrations than have been possible heretofore.

In operation, the mixer 19 is charged with reagent, such as finely-divided lead sulfide suspended in a 32° Baumé caustic soda solution, of a quantity sufficient to treat charged sour oil for a period of days, say 5 to 7, the reagent occupying only a part of the mixer, and the latter being of such volumetric capacity that the dilution of reagent which normally will take place in the estimated period will still only partly fill or occupy the mixer. Sour oil is introduced into the system through the contactor 13, while the reagent is being circulated through the mixer 19, pump 21, contactor 13 and settler 16. As soon as the settler 16 becomes filled with treated oil, the latter meanwhile separating from the heavier reagents, the final treated oil may be withdrawn through the oil gathering pipe 29 to storage 18.

After the caustic has become diluted by chemical reaction with the sour oil or weakened by the treatment to a point below the desirable treating efficiency, a quantity of it is drawn out of the system and replaced by concentrated, for example, 32° Baumé caustic from the reagent source 11. The lead sulfide apparently does not become used up in the process, but merely requires a certain minimum caustic concentration to remain effective so long as it is adequately dispersed as is described herein.

As stated above, the results desired are obtained by first providing a chamber in which the treated oil and reagents may be substantially quiescent, so that complete separation may occur, the oil being continuously drawn off at the top of the chamber and the reagents being directed through the narrow passage between the settler and mixer into the latter, wherein the oil-reagent interface or what would be its equivalent in a quiescent settler preferably is maintained, and wherein the reagents and probably some oil are agitated as by the recirculation system of this example, to keep the reagents in a suspension that will be continuously effective and available for reuse with incoming oil to be treated.

Although a certain specific construction and mode of operation are described and illustrated, it is obvious that many modifications and changes could be made without departing from the invention, and all such that are within the scope of the appended claims are embraced thereby.

I claim:

1. A method of separating a suspension of a finely-divided solid in a liquid suspension medium from a liquid of less density, comprising the steps of passing the whole into a quiescent zone, withdrawing the less dense liquid from the upper portion of said zone, withdrawing the denser liquid in which is suspended the finely-divided solid material through a restricted passage from the lowest part of said zone into a second zone, maintaining flow conditions through said zones so that the interface between said two dissimilar liquids would be in said second zone if it were allowed to become quiescent, and agitating the liquid in said second zone to prevent separation of said solid material at the interface between said liquids.

2. A method according to claim 1 in which said agitation comprises the step of continuously withdrawing liquid and solid material from said second zone and returning a portion thereof to said second zone at sufficient velocity to keep said solid material in uniform suspension in said liquid.

3. A method of continuously treating oil with an aqueous reagent and a finely-divided solid, comprising the steps of contacting a stream of said oil with a suspension of said solid in said reagent to treat said oil, passing the mixture into a quiescent zone, withdrawing the greater proportion of the treated oil from the upper part of said zone, withdrawing said reagent, said solid and a small proportion of said treated oil from the lowest point of said quiescent zone into a second zone at a rate which will prevent accumulations of said reagent and said solid in said quiescent zone and agitating said mixture in said second zone to prevent the formation of a quiescent interface between said treated oil and said aqueous reagent in said second zone.

4. A method according to claim 3 in which said agitation comprises the step of continuously withdrawing liquid and solid materials from said second zone and returning a portion thereof to said second zone at sufficient velocity to prevent the formation of an interface thereon.

5. A method of treating oil according to claim 3 in which said aqueous reagent is a caustic solution and said finely-divided solid is lead sulfide.

CHARLES W. STRATFORD.